US012592439B2

(12) United States Patent
Pereira Cadena et al.

(10) Patent No.: US 12,592,439 B2
(45) Date of Patent: Mar. 31, 2026

(54) EXTRUDED THERMOLASTIC BATTERY ENCLOSURE

(71) Applicant: SABIC Global Technologies B.V., Bergen op Zoom (NL)

(72) Inventors: Carlos Pereira Cadena, Putnam Valley, NY (US); Dinesh Munjurulimana, South Lyon, MI (US); Anil Tiwari, Maastricht (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 510 days.

(21) Appl. No.: 18/268,895

(22) PCT Filed: Dec. 16, 2021

(86) PCT No.: PCT/EP2021/086135
§ 371 (c)(1),
(2) Date: Jun. 21, 2023

(87) PCT Pub. No.: WO2022/136094
PCT Pub. Date: Jun. 30, 2022

(65) Prior Publication Data
US 2024/0055711 A1 Feb. 15, 2024

(30) Foreign Application Priority Data

Dec. 22, 2020 (EP) .................................... 20216662

(51) Int. Cl.
H01M 50/231 (2021.01)
H01M 10/613 (2014.01)
(Continued)

(52) U.S. Cl.
CPC ....... H01M 50/231 (2021.01); H01M 10/613 (2015.04); H01M 10/6567 (2015.04);
(Continued)

(58) Field of Classification Search
CPC ........... H01M 10/613; H01M 10/6556; H01M 10/6567; H01M 50/227; H01M 50/229; H01M 50/231
See application file for complete search history.

(56) References Cited

U.S. PATENT DOCUMENTS

2013/0344362 A1    12/2013    Raisch et al.
2018/0337375 A1    11/2018    Kellner et al.
2022/0263152 A1     8/2022    Pereira et al.

FOREIGN PATENT DOCUMENTS

DE        102015206522 A1    10/2016
DE        102016220877 A1     4/2018
(Continued)

OTHER PUBLICATIONS

International Search Report for International Application No. PCT/EP2021/086135; International Filing Date Dec. 16, 2021; Date of Mailing Mar. 31, 2022; 4 pages.
(Continued)

*Primary Examiner* — Kevin E Yoon
(74) *Attorney, Agent, or Firm* — CANTOR COLBURN LLP

(57) ABSTRACT

An apparatus for housing battery cells arranged in a cluster, the enclosure having a wall formed of a low-cost monolithic extrusion formed of a thermoplastic and defining a plurality of elongate parallel hollows extending across the enclosure. The extrusion can include a metal sheet fastened to one side to provide an out downward-facing barrier against heat and road debris.

20 Claims, 14 Drawing Sheets

(51) Int. Cl.
  *H01M 10/6567*     (2014.01)
  *H01M 50/211*      (2021.01)
  *H01M 50/227*      (2021.01)
  *H01M 50/229*      (2021.01)

(52) U.S. Cl.
  CPC ....... *H01M 50/211* (2021.01); *H01M 50/227*
                 (2021.01); *H01M 50/229* (2021.01)

(56)                    References Cited

FOREIGN PATENT DOCUMENTS

| EP | 3748711 A1 * | 12/2020 | .......... H01M 10/613 |
| WO | 2020196878 A1 | 10/2020 | |
| WO | 2020200885 A1 | 10/2020 | |

OTHER PUBLICATIONS

Romberg et al.; "Passive Damping of Sandwich Panels"; 10th European Conference on Spacecraft Structures, Materials & Mechanical Testing; Oct. 13, 2007.
Written Opinion for International Application No. PCT/EP2021/ 086135; International Filing Date Dec. 16, 2021; Date of Mailing Mar. 31, 2022; 5 pages.

* cited by examiner

Fig. 10

Fig. 12A
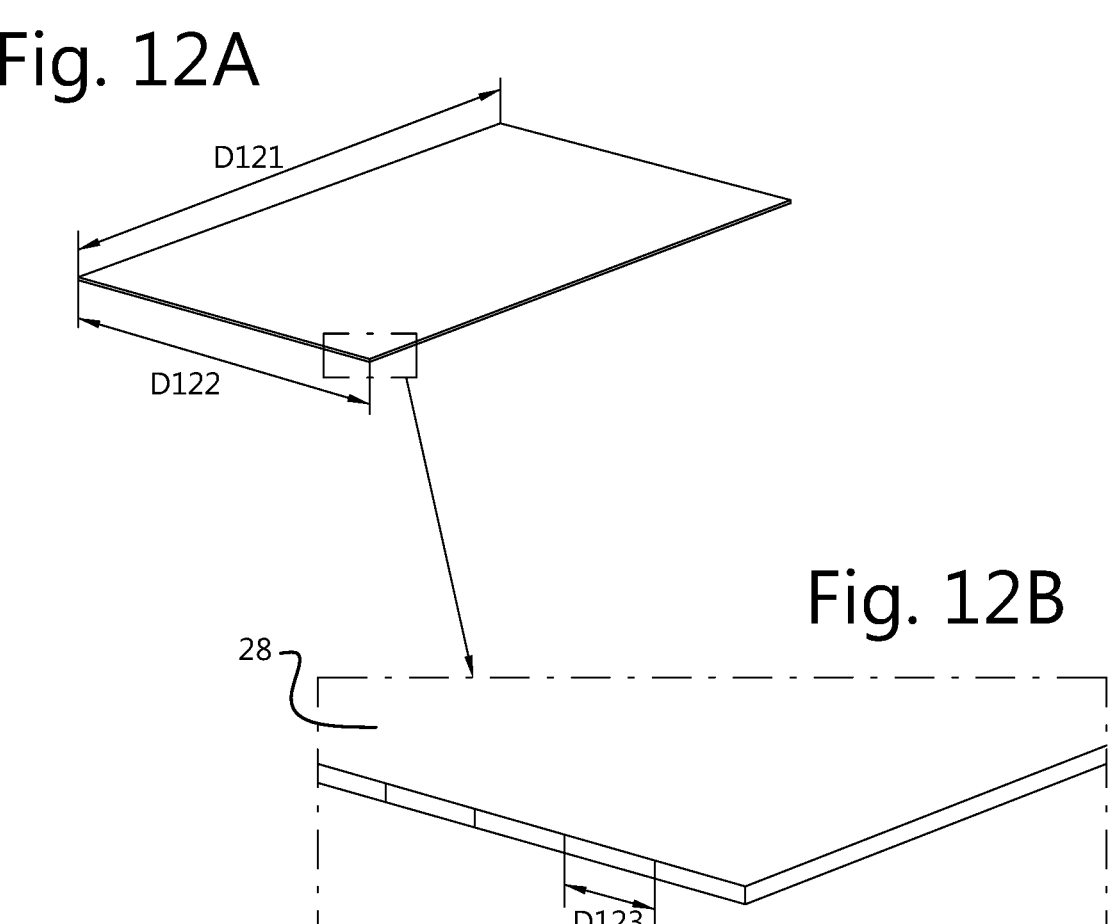
D121
D122
Fig. 12B
28
D123
Fig. 12C
Fig. 12D
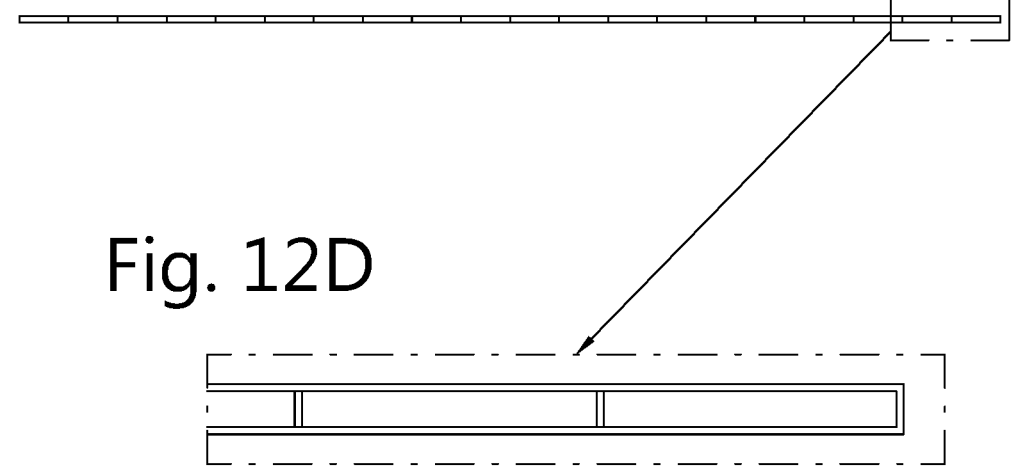

EXTRUDED THERMOLASTIC BATTERY ENCLOSURE

CROSS-REFERENCE TO RELATED APPLICATIONS

This application is a National Stage application of PCT/EP2021/086135, filed Dec. 16, 2021, which claims the benefit of European Application No. 20216662.5, filed Dec. 22, 2020, both of which are incorporated by reference in their entireties herein.

TECHNICAL FIELD

The present invention relates to a battery pack, in particular a battery pack enclosure and a battery assembly, such as for use in a battery pack for an electric vehicle.

BACKGROUND

As the automotive industry transitions from early examples electrification, to more evolved examples leveraging scaled-up manufacturing, there is an increasing emphasis on improving the early designs by addressing complexity, weight, and cost. For example, early battery packs were manufactured using enclosures formed of machined metal, or hand-laid composites. While sufficient for purposes of the early, low-volume vehicles, these approaches quickly made obvious the high cost and slow cycle times of working in these materials, not to mention weight penalties suffered because the materials are not optimized for specific packaging or load requirements.

An area that continues to enjoy evolution and improvements is battery pack enclosures for the batteries to power the prime mover. While early examples attempted to leverage the benefits of plastics, these battery trays and enclosures were manufactured using compression molding technologies for thermosets and thermoplastics. These approaches can require expensive metal molds and high-pressure presses with cycle times in the order of 1 minute per part—slower than desired for high-volume automotive manufacturing, which can make as many as one entire vehicle per minute. While these approaches may have been sufficient for early examples of electrification, as volumes increase there is a need to improve cycle time, decrease tooling expense, and address other needs as well, such as recyclability and structural optimization for certain load cases.

US20180337375A1 discloses battery housing with an extruded aluminum plate defining ducts and a plastic plate body defining ducts.

US20130344362A1 discloses a plastic housing that includes at least one section provided for heat dissipation which is formed from a plastic compound which includes at least one additive for increasing the thermal conductivity.

DE102016220877A1 discloses a heat-conducting mat for arrangement between a cooling plate or a housing base of a battery housing and a module housing of a battery module, the stated object is achieved in that the heat-conducting mat has a closed and/or open hollow profile cross-section.

WO2020196878A1 discloses a cooling unit including a structure in which a resin box body and a metal plate-shaped lid body are joined, and at least one of the upper surface and the lower surface of the box body is open and closes the opening.

DE102015206522A1 a thermally conductive cooling plate for supporting the energy store, with several cooling channels being formed in the cooling plate through which a coolant can flow, and an insulation layer which is formed from a material with a lower thermal conductivity than the cooling plate.

SUMMARY

The present subject matter provides several solutions to these problems. By using contour extrusion based designs it is possible to avoid undesirably high capital cost investment. Examples provide for the manufacture parts that leverage the advantages of multiwall contours. Examples disclosed herein provide a low-costs battery enclosure and/or enclosure made from a simple extruded multi-wall thermoplastic. Various approaches disclosed herein meet relevant performance criteria. Examples drive out cost by simplifying manufacturing, in part by making manufacturing more efficient, such as by shortening cycle times.

Examples disclosed herein provide an apparatus for housing battery cells or modules arranged in a cluster, with the housing or enclosure having a wall formed of a low-cost monolithic extrusion. The wall can be formed of a thermoplastic and defining a plurality of elongate parallel hollows extending across the enclosure. The extrusion can include a metal sheet fastened to one side to provide an out downward-facing barrier against heat and road debris.

Examples leverage thermoplastic contour extrusion technologies for the manufacture of electrical vehicle battery pack trays and enclosures. Multiwall design can allow for the integration of frictional damping elements. Examples can provide for coolant circulation. Multiwall wall or tray designs can dampens dynamic loads such as free fall of the battery case or a vehicle drop on a cylindrical pole. Certain designs disclosed herein can beneficially reduce external heat transfer into internal battery pack components.

BRIEF DESCRIPTION OF THE DRAWINGS

FIG. 10 shows an interior view of battery cells and cooling apparatus, according to some examples.

FIG. 12A shows a perspective view of an inner sheet, according to some examples.

FIG. 12B shows a close up of the section labeled 12B in FIG. 12A.

FIG. 12C shows an end view of the inner sheet of FIG. 12A.

FIG. 12D shows a section view of the section labeled 12D in FIG. 12C.

DETAILED DESCRIPTION

A traditional battery pack enclosure might be formed of machined or stamped metal, which would provide for strength and toughness, but which is heavy. Accordingly, some designs might rely on composites, such as carbon fiber composites utilizing a thermoset polymer matrix. While offering many desirable performance characteristics, such designs suffer from a lack of efficient manufacturing technologies. Components may have be hand laid, for example. Even if automated, the unique requirements of such designs often place them out of contention for economical, reliable, mass manufacturing. While some have tried to utilize the innate benefits of injection molding technology, it's not hard to imagine how difficult it is to make such a large part—extremely expensive and large molding machines must be used, requiring expensive controls, and a high yield to maintain business feasibility.

The present subject matter addresses all of these shortcomings by utilizing a comparatively simple multi-wall extrusion for one or more walls of a battery pack. Why many of the designs disclosed herein are planar, the present subject matter is not so limited, as multi-wall sheets can enjoy some secondary forming while still maintaining their benefits, which include light weight, strength, stiffness, sound and heat insulation, and economical manufacturing via an extrusion line that can run continuously. Examples disclosed here start with a multi-wall enclosure components positioned at the base of the battery pack, and add secondary components, such as endplates, or even cooling manifolds, so replicate or add to the function of pre-existing battery enclosures.

Figure 1:
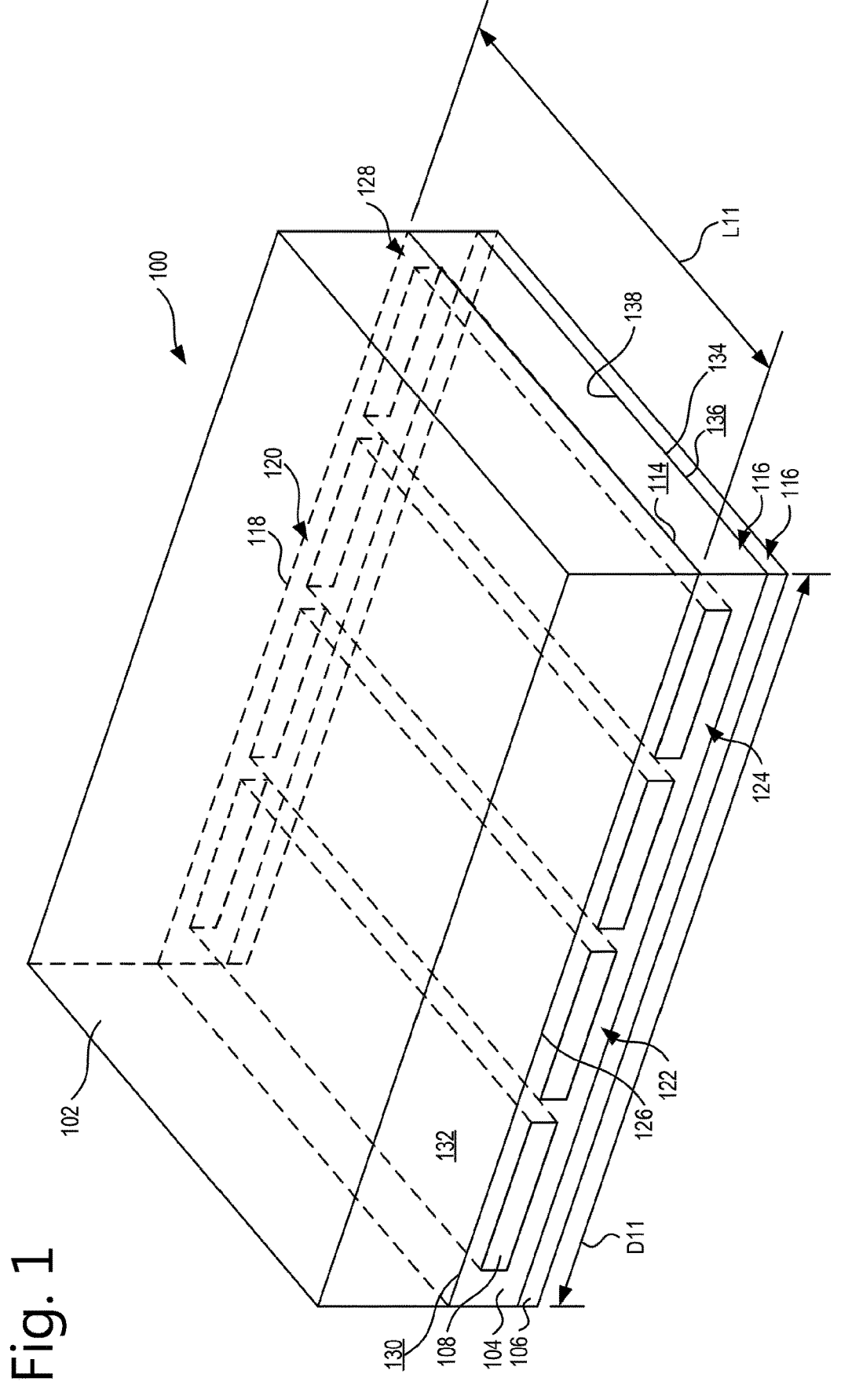
FIG. 1 shows a perspective view of a enclosure having an inner sheet that is extruded, according to some examples.

FIG. 1 shows a perspective view of a cross-section of a battery pack, showing a simplified enclosure at the bottom featuring an enclosure component that includes an inner sheet that is extruded. The enclosure is for a battery pack 100 having battery modules 102, shown as a cuboid for simplification. In an example, the plurality of modules are arranged in a cluster such that they define a planar surface. Thus the illustration shows the cluster as a monolith, instead of individual modules, for the sake of clarity. Although the illustration shows the cluster as approximating a regular hexohedron, the present subject matter is not so limited, and would in reality probably occupy an irregular shape. In many cases, however, the cluster will define at least one planar face.

The battery pack includes a lower enclosure that includes an enclosure component 116. Much like the glass in a picture frame, the enclosure component forms a part of the lower enclosure of the battery pack 100.

The enclosure component 116 can include a lower sheet 106. The lower sheet can be metallic, and is the portion of the battery pack one would see when viewing the battery pack from the bottom, or indeed the bottom of an electric vehicle. The lower sheet is engineered to perform a number of functions. One is to manage abrasion, another is to resist puncture, and as disclosed herein, it can also disperse heat. The lower sheet 106 can be dimensioned to substantially cover the planar face 114 of a battery module cluster 102, such as by being coextensive therewith, although it can extend beyond an edge 118, or can cover only a portion of the face 114.

The enclosure component 116 can have a proximal portion 120 and a distal portion 122. The enclosure component can be dimensioned such that a distance D11 between the proximal portion 120 and the distal portion 122 is sized to extend from a first location 124 proximal a first edge 126 of the planar face 114, across the planar face 114, to a second location 128 proximal a second edge 118 of the least one planar face 114 that is opposite the first edge 126 of the least one planar face 114.

The enclosure component can include an inner sheet 104. The inner sheet 104 is the essence of the present disclosure. By recognizing that the major portion of the bottom enclosure of a battery pack can be formed of a sheet of extruded plastic, the present disclosure provides a very simple, low-cost method of providing a large battery enclosure, without sacrificing performance.

The inner sheet 104 can define an upper contour 130. The upper contour 130 can extend along an upper major face 132 and a lower contour 134 along a lower major face 136 disposed opposite the upper major face 132. The inner sheet 104 can be formed of a monolithic extrusion.

The inner sheet 104 can be formed of a thermoplastic. Examples of thermoplastic include, but are not limited to, polypropylenes such as UL94 V0 polypropylene compounds with high specific strength and specific stiffness, polycarbonate and/or ABS compounds such as UL94 V0 high flow PC/ABS compound flame retardant polycarbonate compounds with UL94 V0 rating at low thickness, polyester compounds with low temperature ductility for impact absorbers, polyethylene, polystyrene, polyvinyl chloride, polytetrafluoroethylene, and the like. The inner sheet 104 can define a plurality of elongate parallel hollows 108. The hollows 108 can extend a length L11 of the enclosure component 116, between the proximal portion 120 and the distal portion 122.

A lower sheet 106 can be disposed against the inner sheet 104. The lower sheet 106 defines a lower sheet contour 138 shaped to conform to the lower contour 134 of the inner sheet 104. The lower sheet 106 can be formed of a material other than the thermoplastic of the inner sheet 104. The inner sheet 104 and the lower sheet 106 can be fastened together such that the enclosure component forms a rigid assembly.

Figure 2:
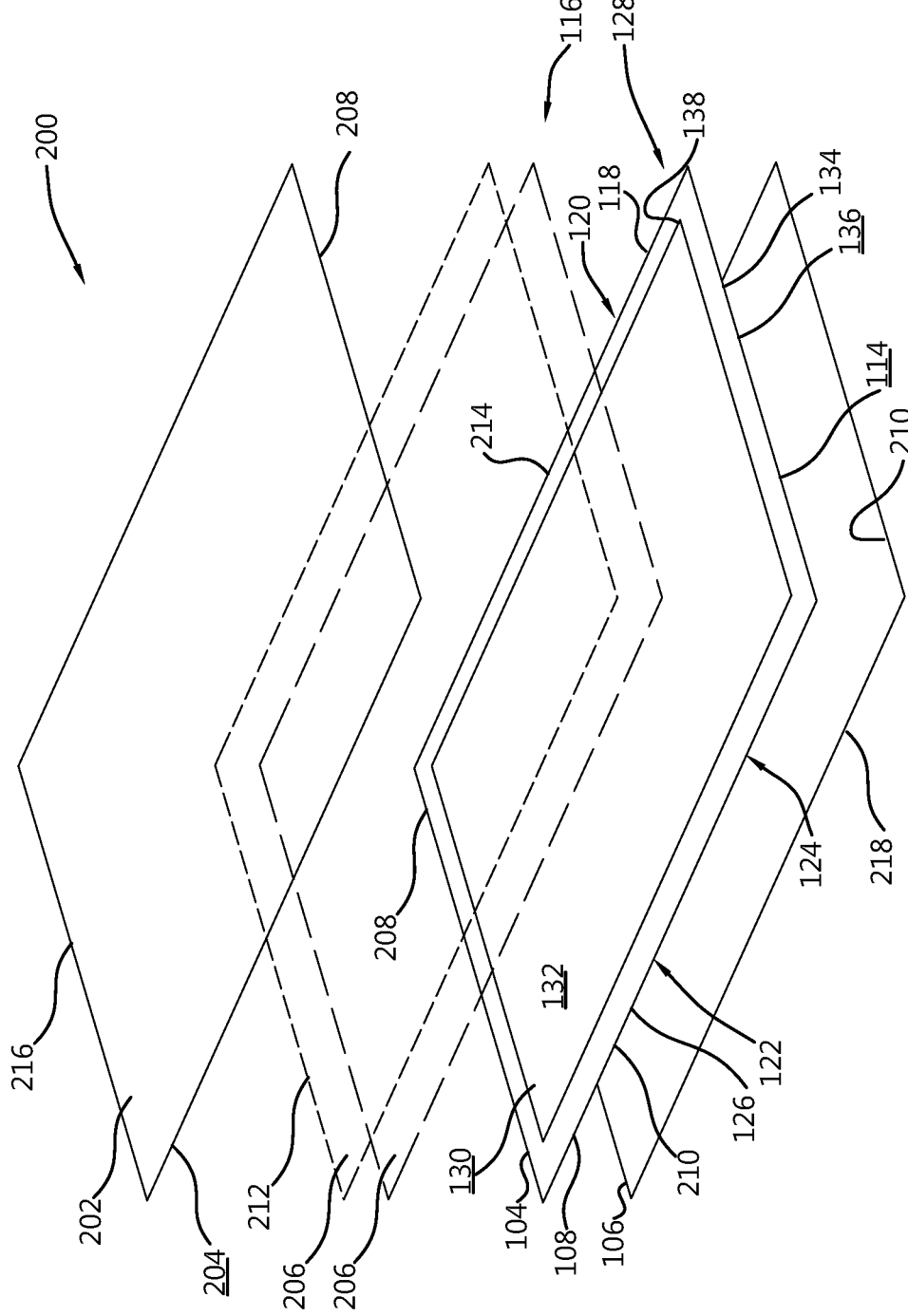
FIG. 2 shows an exploded view of a enclosure component, according to some examples.

FIG. 2 shows an exploded view of an enclosure component 200, according to some examples. This illustration builds on the illustration of FIG. 1 by providing an upper sheet 202 that can be disposed against the inner sheet 104, thereby providing an A-B-A sandwich, or an upper-sheet/inner-sheet/lower-sheet sandwich.

The upper sheet 202 can define an upper sheet contour 204 The upper sheet contour can be shaped to conform to the upper contour 130 of the inner sheet 104. The upper sheet 202 can be formed of a material other than the thermoplastic of the inner sheet 104. The upper sheet can be formed of a metal. The upper sheet is useful for dispersion of heat, as well as for resisting puncture.

The upper sheet 202, inner sheet 104, and lower sheet 106 can be fastened together such that the composite wall or bottom wall forms a rigid assembly. An adhesive 206 can be disposed along at least one of an upper interface 208 between the upper sheet 202 and the inner sheet 104.

An adhesive can be disposed along a lower interface 210 between the lower sheet 106 and the inner sheet 104. The adhesive can be a film. The adhesive can be a pressure sensitive adhesive, a thermoset, a spray, or other suitable adhesives. The adhesive can have an adhesive perimeter 212 that can be coextensive to an inner sheet perimeter 214 of the inner sheet 104. An upper sheet perimeter 216 of the upper sheet 202 can be coextensive with an inner sheet perimeter 214 of the inner sheet 214. A lower sheet perimeter 218 of the lower sheet 106 can be coextensive with the inner sheet perimeter 214. The upper sheet perimeter 216, inner sheet perimeter 214 and lower sheet perimeter 218 can all be coextensive.

An thermally conductive paste can be disposed along at least one of an upper interface 208 between the upper sheet 202 and the inner sheet 104. A thermally conductive past can be disposed at a lower interface 210 between the lower sheet 106 and the inner sheet 104.

Figure 3:
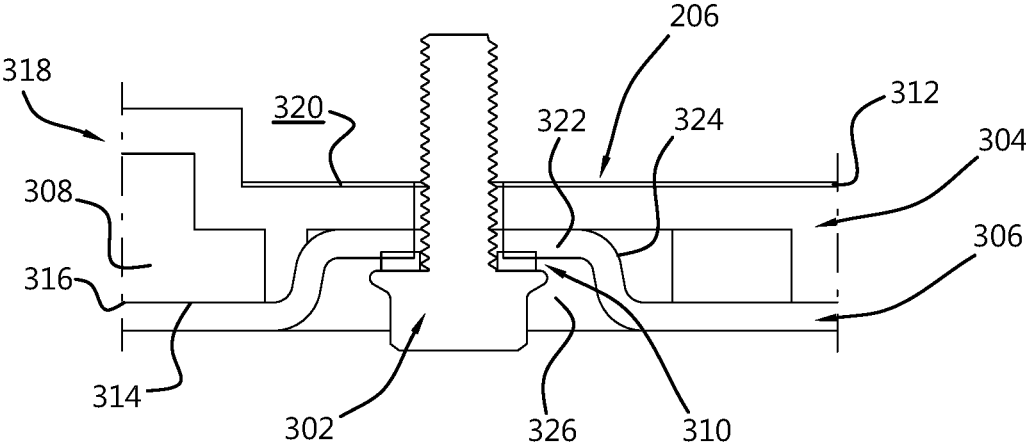
FIG. 3 shows cross-section of a enclosure component and a fastener, according to some examples.

FIG. 3 shows cross-section of an enclosure component and a fastener, according to some examples. The multi-wall or enclosure component 318 defines hollows 308 and can be integrated as the lower tray in a battery case with an external metal sheet to protect against penetration of nails and to distribute heat on the lower face. An upper side 320 can also be clad with a metal plate allowing a complete sandwich construction. An adhesive 206 can be disposed along at least one of an upper interface 312 between the upper sheet (not shown) and the inner sheet 304. The lower plate or sheet 306 can be bolted as shown. An adhesive 314 can be disposed along a lower interface 316 between the lower sheet 306 and the inner sheet 304. A combination of the two methods can be used. Bolting to vehicular metal cross bars or another part of a vehicle frame can ensure that the bottom will not fall off or buckle during fire testing or after fire, or in use by the consumer.

A fastener 302 can fasten the inner sheet 304 to the lower sheet 306. The lower sheet can have a protrusion 322 registered to a recess 324 defined by the inner sheet 304. The protrusion 322 can define a recess 326 in the lower sheet 306, and the fastener 302 can be disposed in the recess 326. An elastomeric washer 310 can be disposed between the fastener 302 and the lower sheet 306. A crush washer can be disposed between the fastener 302 and the lower sheet 306.

Figure 4:
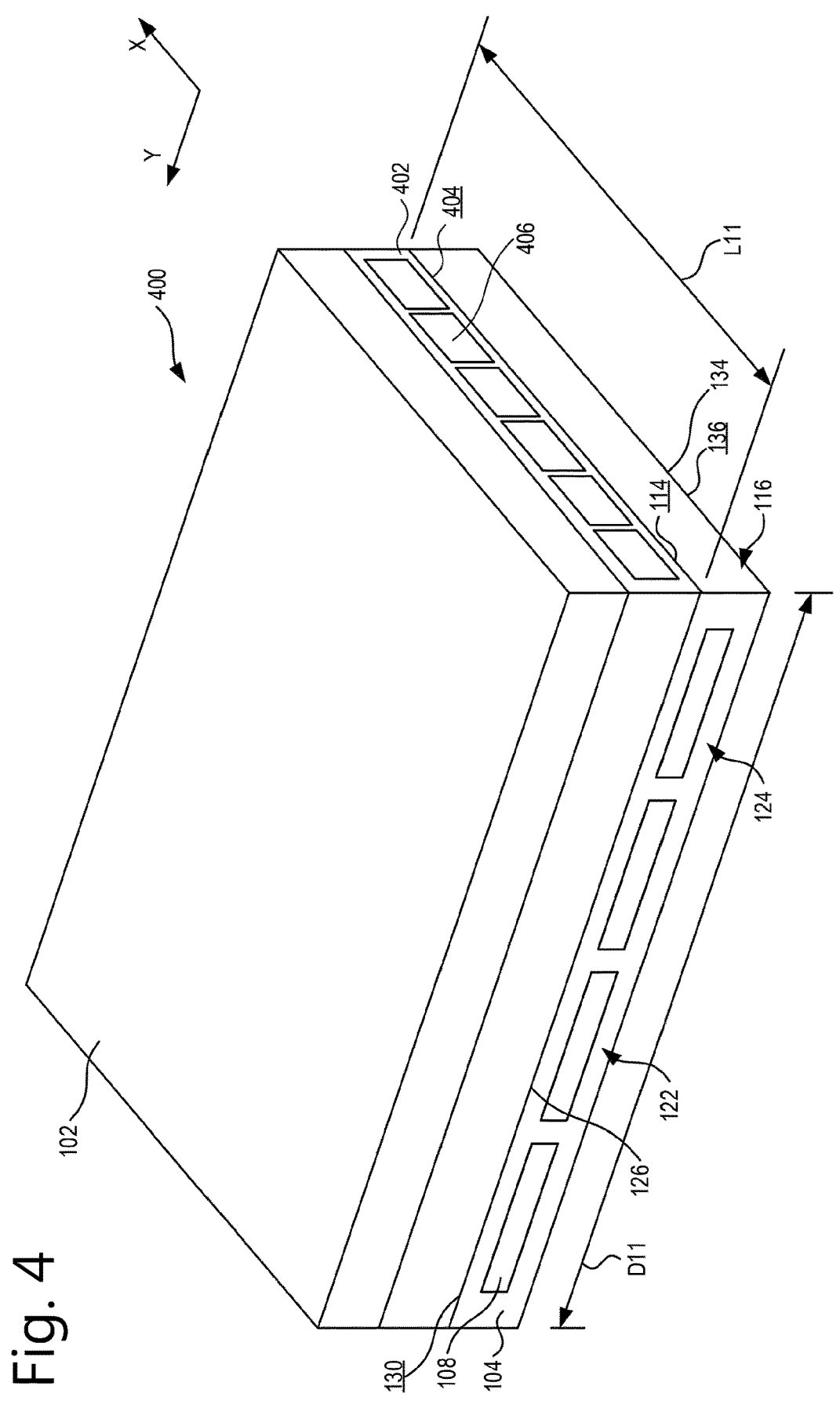
FIG. 4 shows a perspective view of a enclosure component with multiple layers of extrusion, according to some examples.

FIG. 4 shows a perspective view of an enclosure component for a battery pack 400 with multiple layers of extrusion, according to some examples. Since the inner sheet may have anisotropic flexural properties, a second extruded sheet can be added having property to balance those of the first extruded sheet, thereby providing an assembly that has isotropic flexural properties, or flexural properties specifically tuned to the needs of a specific vehicle.

A second inner sheet 402 can be disposed against the inner sheet 104. The second inner sheet 402 can define a second inner sheet contour 404 which can be shaped to conform to the upper contour 130 of the inner sheet 104. The second inner sheet 402 can comprise a second monolithic extrusion defining a second plurality of elongate parallel hollows 406. The second inner sheet 402, inner sheet 104 can be fastened together such that the composite wall forms a rigid assembly. One or both of an upper sheet and a lower sheet can be added to the rigid assembly to further increase rigidity. One or both of an upper sheet and a lower sheet can be metallic.

The second plurality of elongate parallel hollows 406 can be aligned to the first plurality of elongate parallel hollows 108 such that a first hollow of the first plurality of elongate parallel hollows is skew to a second hollow the second plurality of elongate parallel hollows. As illustrated, the inner sheet 104 and the second inner sheet 402 can be aligned in an x-y plane in a 0°/90° alignment.

The second inner sheet 402 and the inner sheet 104 can be formed of the same thermoplastic. The second inner sheet 402 and the inner sheet 104 can be fastened to one another via a polymer bond. Example of polymer bonds include cross-polymerization, welding (e.g., heat staking), lamination, and other bonds. The second inner sheet 402 and the inner sheet 104 can be adhered to one another. The second inner sheet 402 and the inner sheet 104 can be fastened to one another with one or more mechanical fasteners, such as using aspects of the embodiment illustrated in FIG. 3.

An upper sheet can be disposed against the second inner sheet 402. The upper sheet can be formed of a material other than the thermoplastic of the second inner sheet 402. Examples include, but are not limited to, metallic materials. The upper sheet, second inner sheet 402, inner sheet, Is and lower sheet are fastened together such that the composite wall forms a rigid assembly.

Figure 5:
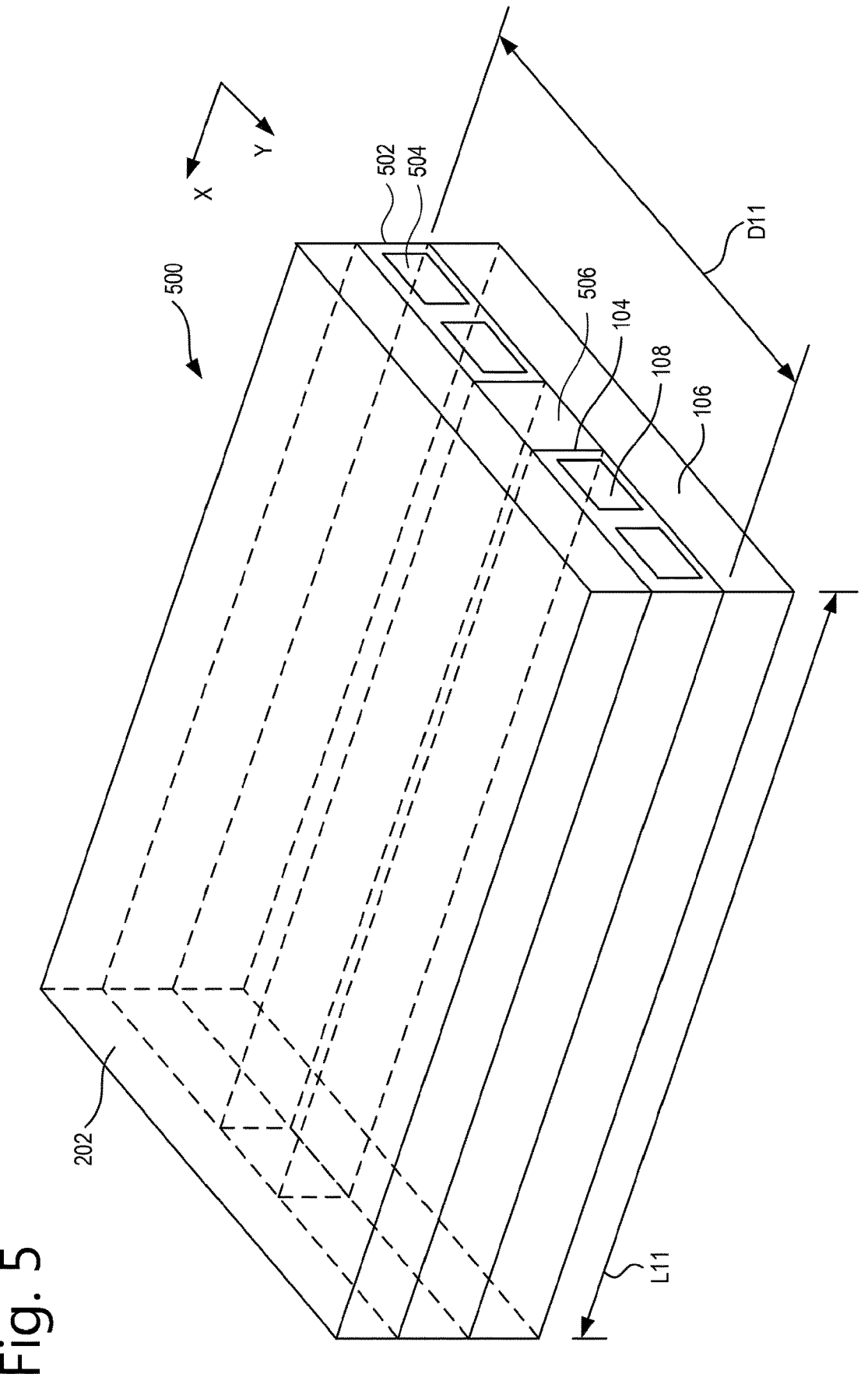
FIG. 5 shows a perspective view of a enclosure component with multiple layers of extrusion, and a damper, according to some examples.

FIG. 5 shows a perspective view of an enclosure component with multiple layers of extrusion, and a damper, according to some examples. The enclosure component 500 can include a lateral inner sheet 502 disposed lateral to the first inner sheet 104, defining a gap 506 between the inner sheet 104 and the lateral inner sheet 502. The lateral inner sheet 502 can define one or more hollows 504, but the present subject matter is not so limited. A damper, such as those illustrated in FIGS. 6A and 6B, can be disposed in the gap 506. The damper can be disposed in a slidable relationship with at least one of the upper sheet 202, the lower sheet 106, the first inner sheet 104 and the lateral inner sheet 502. The function of the damper is described in the publication Romberg, Oliver, Tausche, Matthias, Pereira, Carlos, and Panning, Lars (2007) Passive Damping of Sandwich Panels, 10th European Conference on Spacecraft Structures, Materials & Mechanical Testing, at 10-13 which recites in part:

"The structural stresses and strains due to displacements caused by dynamic loads can be reduced by mechanical damping based on passive or active measures. Passive damping systems can be relatively simple and yet are capable of suppressing a wide range of mechanical vibrations. Concepts are low-priced in development, manufacturing and application as well as maintenance-free."

"Compared to active damping measures, passive elements do not require electronics, control algorithms, power, actuators, sensors as well as complex maintenance. Moreover, a reliable application of active dampers for higher temperatures and short response times (e.g. re-entry environment) is questionable. The physical effect of passive dampers is based on the dissipation of load induced energy."

One or both the upper sheet 202 and lower sheet 106 can comprise any of the sheets disclosed herein, including metallic sheets, thermoplastic sheets, extruded sheets, and other materials and designs, including damped sheets as disclosed herein.

Figures 6A, 6B:
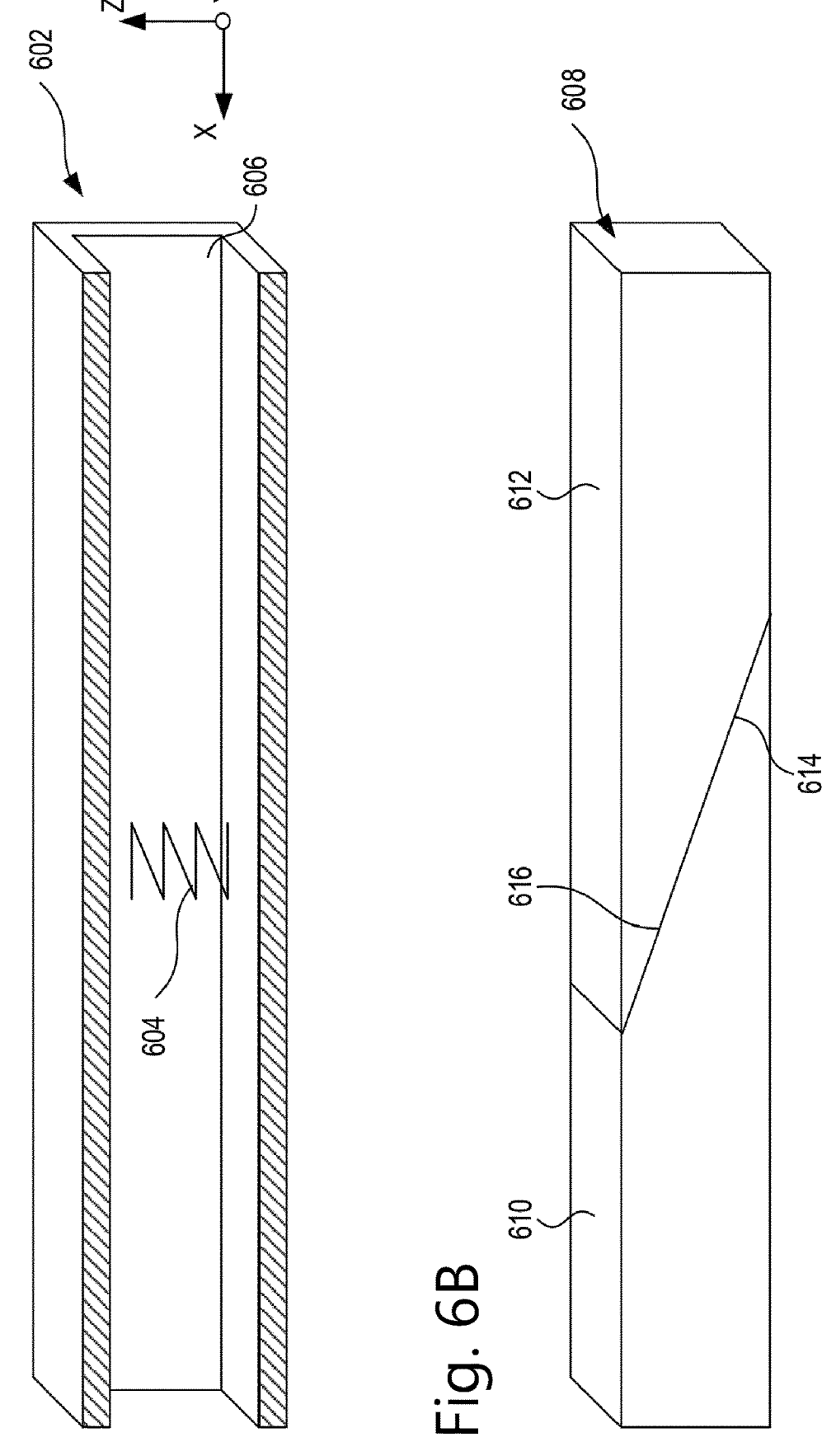
FIG. 6A shows a damper employing spring bias, according to an example.
FIG. 6B shows a damper employing compression and/or flexural resistance, according to an example.

FIG. 6A shows a damper employing spring bias, according to an example. The damper can be interference fit in the gap. The illustration shows a symbol of a spring 604 representing that the damper endures elastic compression in use. The compression can be in one or more of the X-Z and X-Y planes. Freedom to move along the X-Z enables the damper to rub against an abutting structure. The damper 602 can be formed of extruded thermoplastic, defining a hollow 606, as illustrated, but the present subject matter is not so limited, and can include monoliths, or even spring assemblies include coil springs, leaf springs, and the like.

FIG. 6B shows a damper 602 employing compression and/or flexural resistance, according to an example. A damper disposed in the gap, the damper 608 can comprise a first section 610 and a second section 612 in slidable relationship to one another. The first section 610 can comprise a first ramp 616, and the second section comprises a second ramp 614 mated to the first ramp 616, such that the damper 608 defines a cuboid shape.

Figure 7:
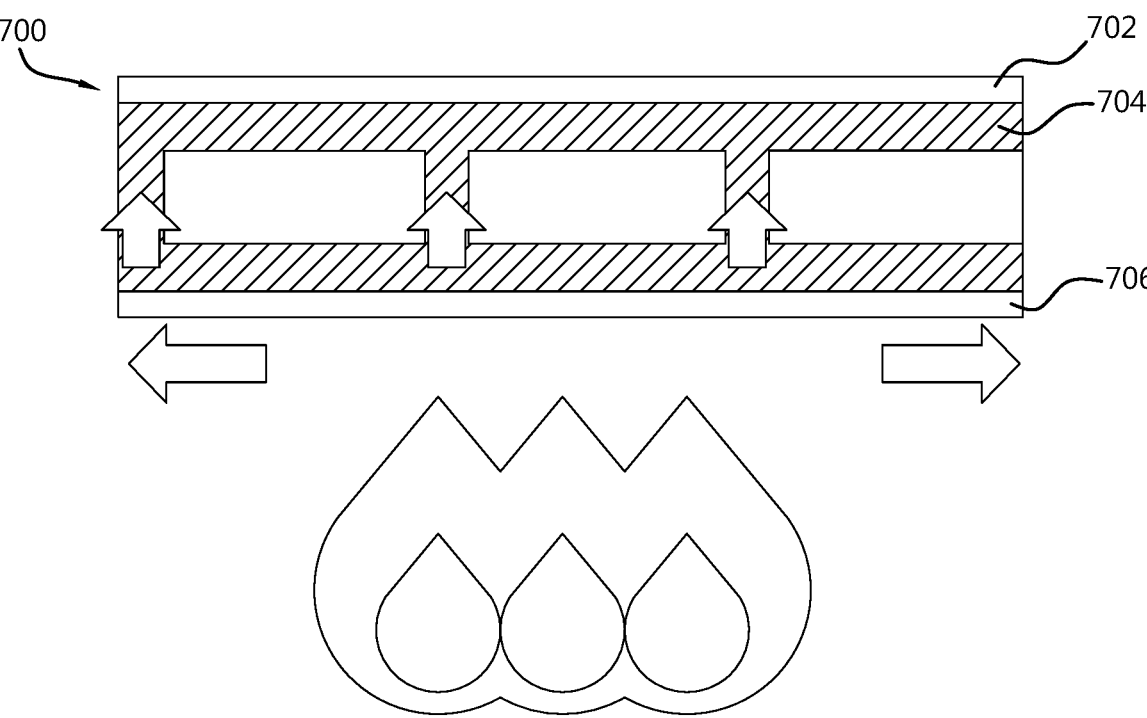
FIG. 7 shows a schematic showing heat transfer in a enclosure component, according to some examples.

FIG. 7 shows a schematic showing heat transfer in an enclosure component, according to some examples. The multiwall or enclosure component 700 can act mechanically as a core in a sandwich structure with thin metal facesheets. Such a configuration provides structural advantages, such as in comparison to the layers when used individually. For example, the enclosure component 700 is stiffer when bending than any of its constituent parts alone. It can also be harder to puncture. It is also lighter than a structure made with a single material, and lighter than other approaches, such as thermoset-filled honeycomb. The fastening system depicted in relation to FIG. 3. can be used to fasten two or three layers in a sandwich structure.

In addition to these mechanical advantages the multiwall or enclosure component 700 slows the heat path from an external source to the battery modules and cells by limiting the thermal bridge to the walls. The illustration shows heat conduction through the inner sheet 704. Concurrent with such conduction the lower sheet 706, also referenced as a facesheet, can be formed of metal which conducts heat outwards at a rate of conduction that is greater than that through the inner sheet 704. A benefit of this is that the lower sheet 706 disperses heat energy across the bottom of a battery pack, thereby absorbing more heat energy, which can decrease the amount of heat that travels to an individual cell, such as a cell disposed in close proximity to a heat source. An upper sheet 702 can similarly add stiffness and disperse heat.

Figures 8A, 8B:
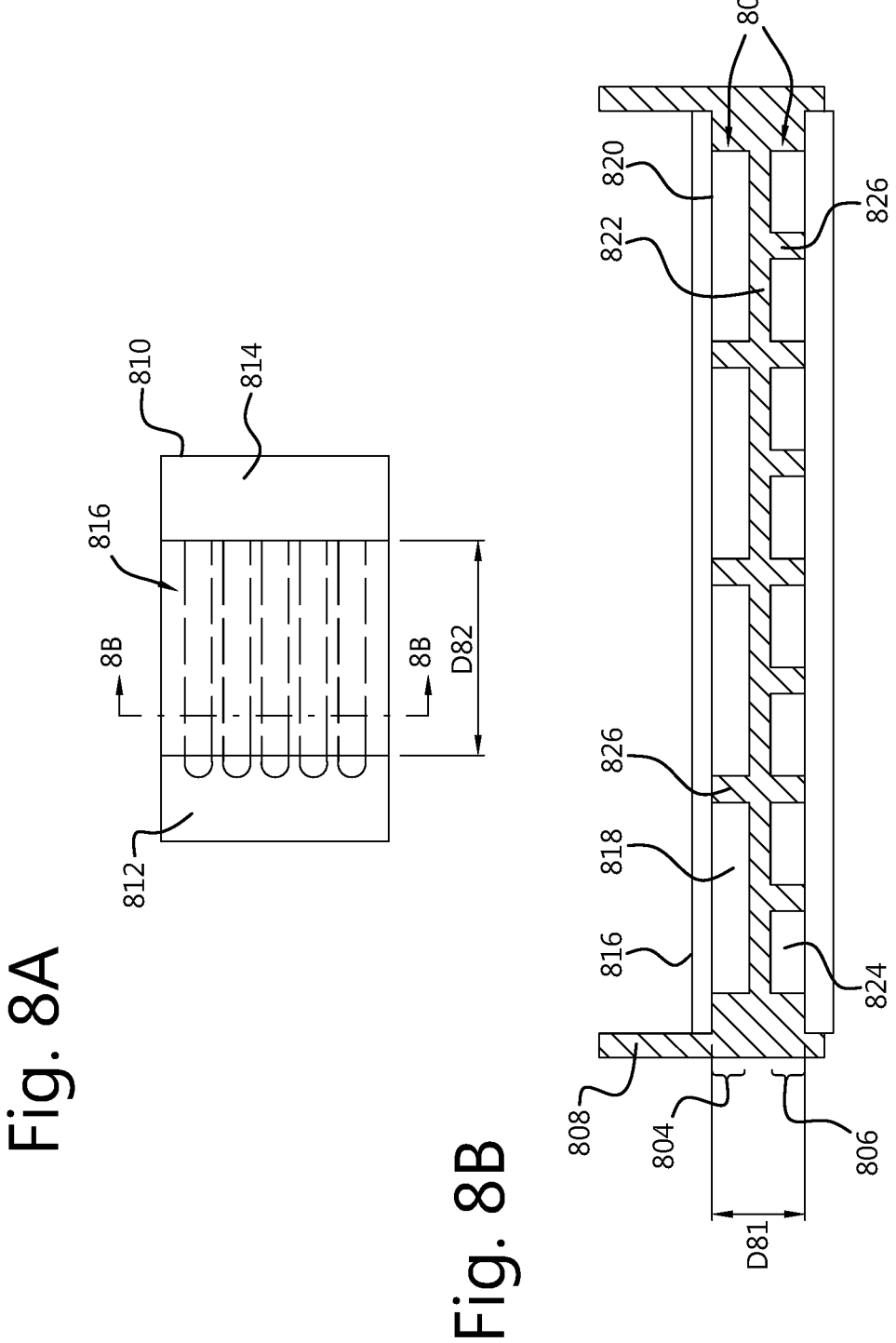
FIG. 8A shows a plan view of a enclosure component, according to an example.
FIG. 8B shows a cross-section of a enclosure component taken along the line 5A-5A showing liquid cooling, according to some examples.

FIG. 8A shows a plan view of an enclosure component, according to an example. FIG. 8B shows a cross-section of an enclosure component taken along the line 8B-8B showing liquid cooling, according to some examples. An inner sheet 808 can include a plurality of elongate parallel hollows 802. The hollows 802 can be organized in a plurality of rows, e.g. in a first row 804 and a second row 806. Two or more of the plurality of rows can be stacked onto one another. Such a stack can define a stack thickness D81 of the inner sheet 808. Although the stacked rows in the illustration are shown to be formed of a single monolithic extrusion, the present subject matter is not so limited. The plurality of rows can extend to transverse to the length D82 of the enclosure component.

A manifold 810 can be coupled with the inner sheet. The manifold can define an interior volume 814 that can be disposed in fluid communication with a certain hollows 816 of the plurality of hollows 802, such that the inner sheet can be configured to direct coolant along the length of the inner sheet 808 via the plurality of coolant hollows 802. A second manifold 812 can be used to redirect the hollows, however the present subject matter is not so limited. For example, individual tubes could be used to connect hollows, as well as any number of conventional piping techniques. Although not illustrated, the plurality of hollows 802, and passages connecting them, can be configured in various ways, to enable a single circuit, multiple circuits, cross-flow, and other cooling architectures as is known in the heat exchanger arts.

The plurality of hollows can be each be fully enclosed via the extrusion of monolithic material such as thermoplastic. Alternatively, the extrusion can form one or more U-shaped channel that are capped by an upper sheet 816. The upper sheet 816 can enclose the plurality of coolant hollows such that they can be sealed along their length to communicate coolant therethrough, such as coolant fluid. While it may prove a challenge to seal such a configuration so the hollows are fluid-tight, various techniques such as gasket, O-ring, or sealant can be used. As such, the upper sheet, which can form a heat sink for battery cells, has a high degree of thermal conductivity with the coolant 818. Forming the hollows 802 from a single extrusion may prove easier for manufacturing, however such a design would endeavor to minimize the material disposed between the upper sheet 816 and the coolant 818. Thus, the upper sheet 816 can be disposed against the inner sheet 808, proximal the plurality of coolant hollows 802. An outer wall 820 of the inner sheet 808 can be can be disposed between the upper sheet 816 and the plurality of coolant hollows 802, and an inner wall 822 can be can be disposed between the plurality of coolant hollows 802 and a plurality of other hollows 824. The outer wall 820 can be thinner than the inner wall 822.

The plurality of hollows 802 can conduct a first coolant such as liquid coolant, while the other hollows 824 conduct a second coolant such as atmosphere. The manifold can be limited to covering the plurality of hollows 802 while the other hollows 824 can be open to atmosphere to allow for conduction via convection. As disclosed herein, conduction enablers such as thermally conductive pastes, can further improve conductivity from the coolant to the upper sheet.

The plurality of coolant hollows 802 can be configured to conduct a variety of coolants, including liquid coolant, and a gas such as atmospheric gas. Each of the plurality of hollows 802 can be rectangular in cross section, defining a width and a height. The width of the hollows can be greater than a height of the hollows. The inner sheet 808 can define a plurality of elongate ribs 826 extending along the length D82 of the inner sheet 808 defining respective sidewalls of the plurality of hollows 802. The ribs can be planar and extend normal to the upper planar face. The ribs can be planar and extend normal to the lower planar face.

Figure 9:
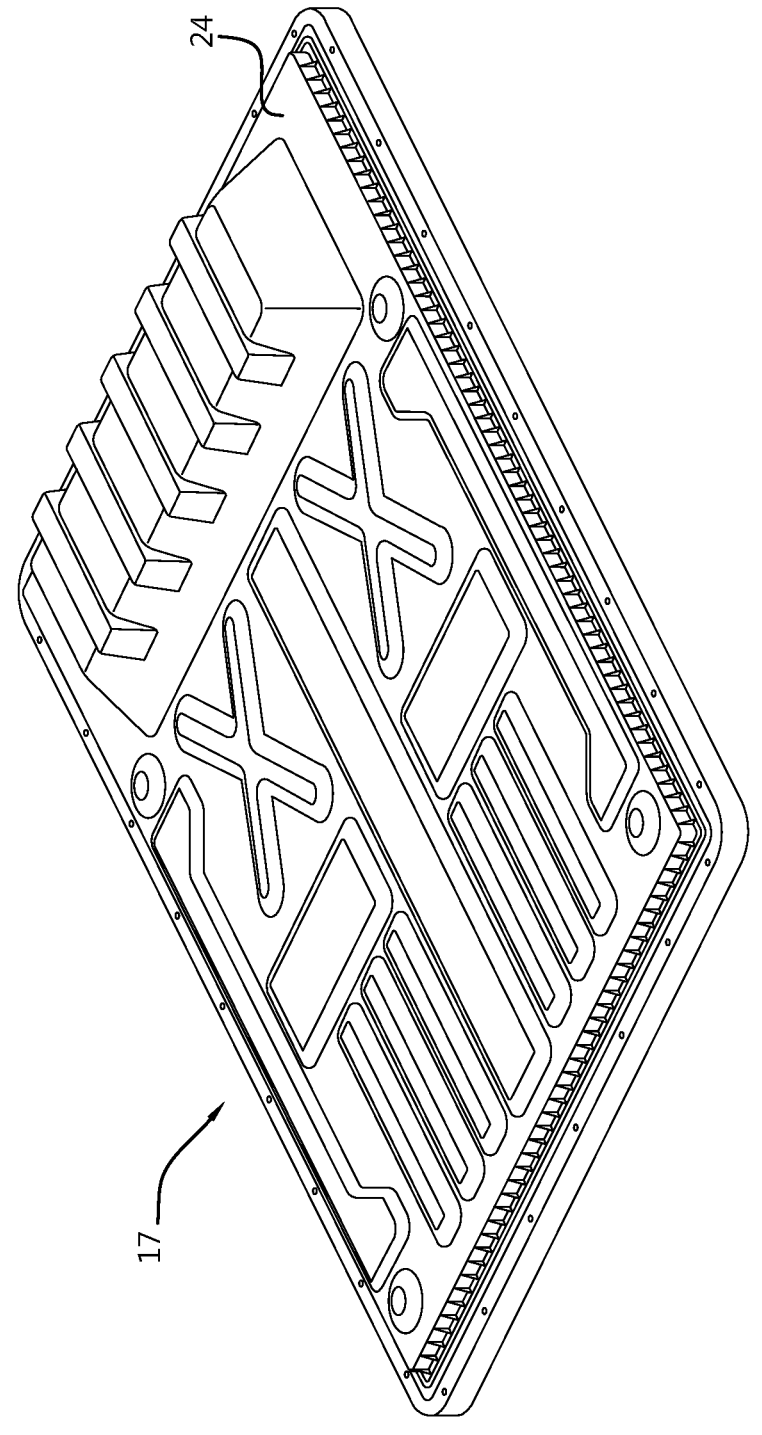
FIG. 9 shows a perspective view of a battery pack, according to some examples.
Figure 10:
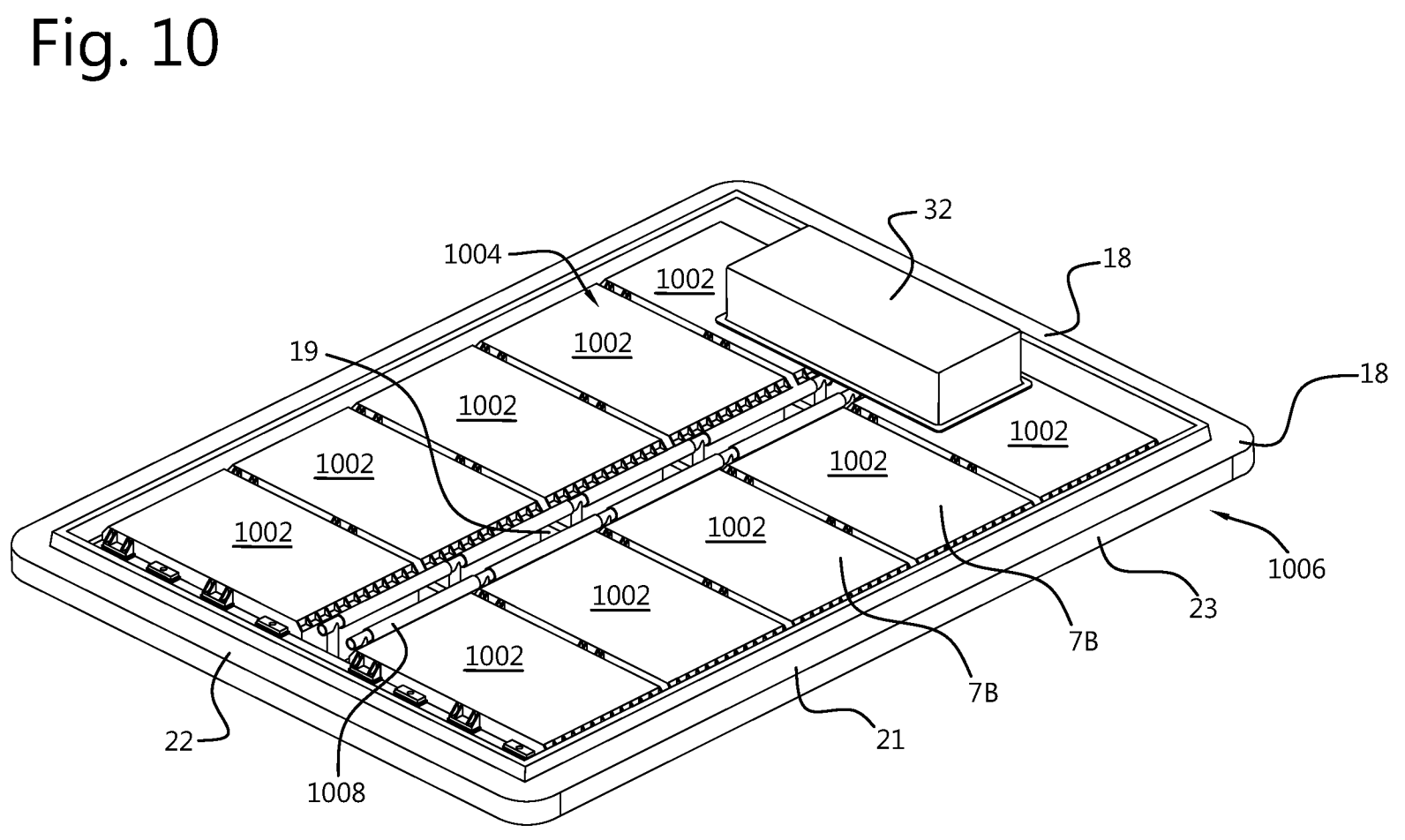
Figure 11A:
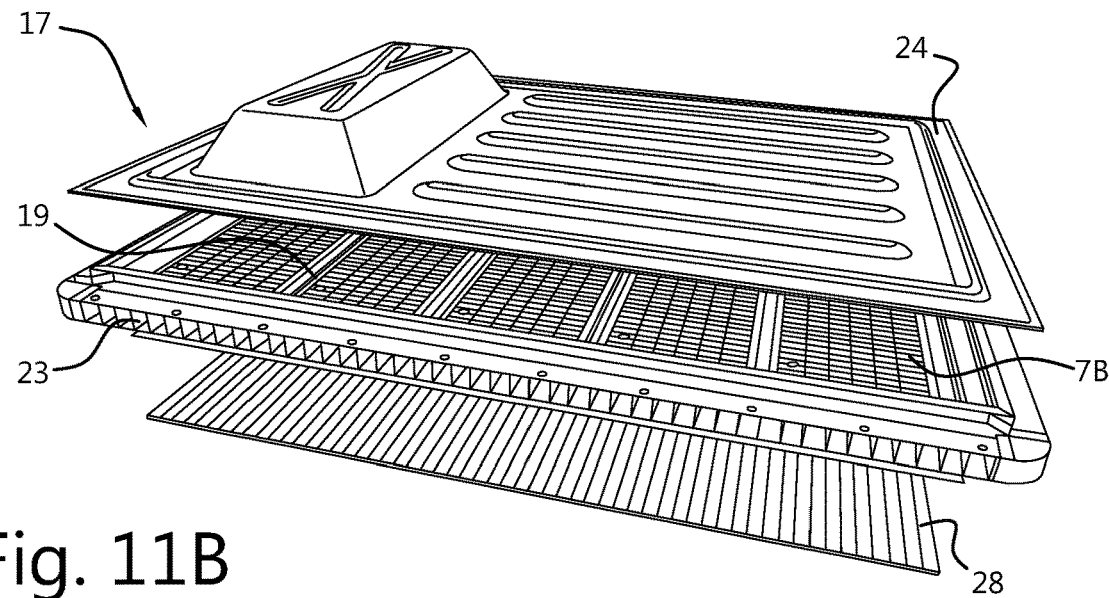
FIG. 11A shows a battery pack, according to some examples.
Figure 11B:
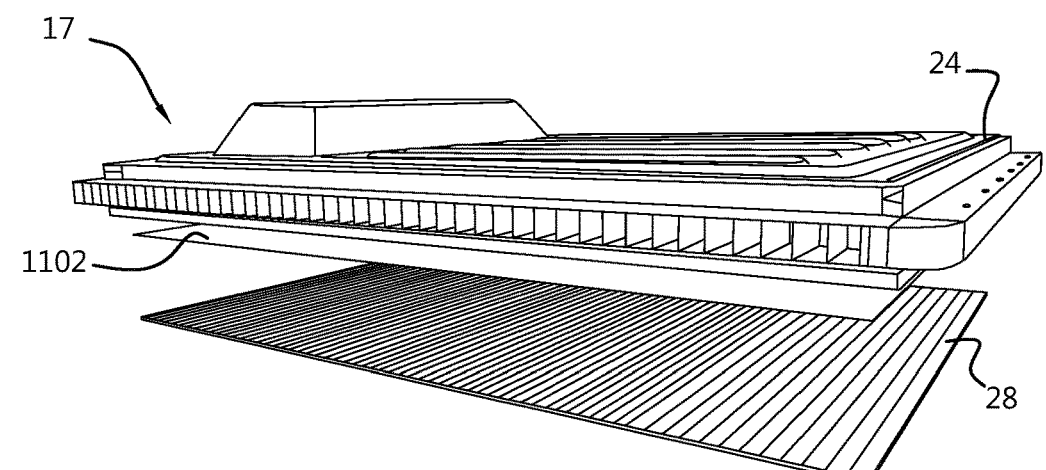
FIG. 11B shows the inner sheet of FIG. 11A.
Figure 11C:
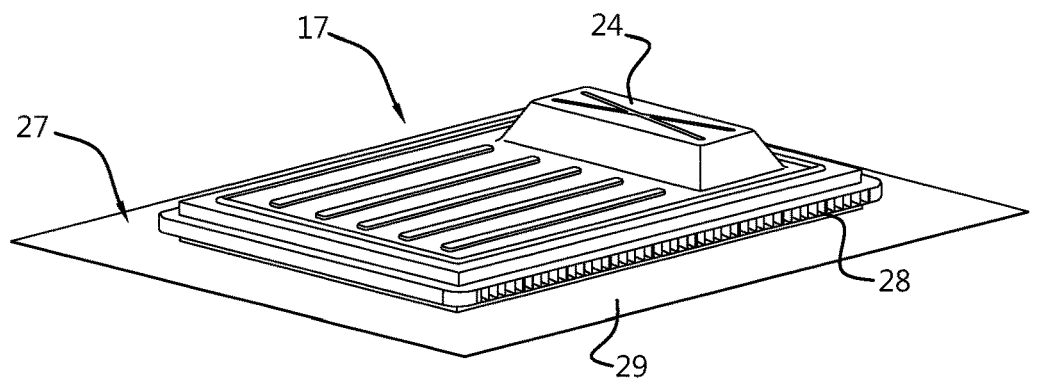
FIG. 11C shows a battery pack according to FIG. 11A assembled to a metallic plate.

FIG. 9 shows a perspective view of a battery pack, according to some examples. The illustrated pack 17 represents a more finished embodiments including many features needed for practical use in a vehicle. The pack 17 includes many of the features disclosed above. FIG. 10 shows an interior view of battery cells and cooling apparatus, according to some examples. FIG. 11A shows an exploded view, according to some examples. FIG. 11B shows the inner sheet of FIG. 11A. The battery pack 17 can be used for powering a prime mover of an electrical vehicle.

The battery pack 17 can comprise battery modules 7B arranged in a cluster having a lower planar face, opposite the planar face 1002 defined by the cells as shown in FIG. 10. A lower enclosure 27 can be sized to house a bottom portion 1006 of the battery modules 7B.

A battery module can comprise at least one battery cell. The battery module can include more than two battery cells, for example 10, 20 30, 40 or more battery cells. The assembly can include pairs or clusters of battery modules 7B numbering for example 2, 4, 6, 8 or 10, etc., a frame 18 comprising within it some spars 19 configured to maintain at least the battery modules 7B, a upper enclosure 24, and a lower enclosure 27. The assembly can include a control module 32, configured in order to monitor each components of the battery pack 17 and regulate the charge and discharge of battery assembly.

In some embodiments, as shown by the FIG. 10, the spars 19 can be regularly distributed within the frame, in order to flank one or more battery modules 7B to physically constrain it. In some embodiments, the spars 19 are made of thermoplastic material, which can comprise a composite and/or a metal plastic hybrid. In some embodiments, the frame 18 can have any kind of shape. It can have a cross-section that is round, triangular, polygonal, preferentially rectangular. In some embodiments, the frame is made of one single piece, and is thus homogenous or monolithic. In some embodiments, the frame 18 is made of beams 21, 22 connected to each other by some connector means 20 for example die casted connectors. In some embodiments, the frame can be made in its whole or in parts in thermoplastic material, composite and/or metal. In some embodiments, the beams 21, 22 of the frame comprise at least a shock and impact absorption means 23. The impact absorption means can include one or more energy absorbers be coupled to the battery pack enclosure around its perimeter.

"Shock and impact absorption means" is defined herein to include any kind of means suitable to absorb and distribute the energy coming from an impact in order to preserve or at least reduce the deformation of the battery assembly. Such shock and impact absorption means can be alveolar structural portion, metallic crush elements, structural foams, or a combination of these or any other means know by the skilled in the art.

The orientation of the alveolar structural portion 23 with respect to the channel in the beam (and also with respect to the opening through the beam) can also be chosen to attain desirable energy absorption characteristics. For example, the alveolar structural portion can form channels that can be oriented 0 degrees (e.g., parallel) to 90 degrees (perpendicular), to the major axis of the beam. In some embodiment the alveolar structural portion 23 can have a honeycomb and/or pillar (rectangle, triangle) shape.

Optionally, in some embodiments, some or all of the alveoli/channels 23 can have foam therein. In other words, the alveoli can, individually, be hollow or filled, such that the structural integrity can be modified by filling particular alveoli, by using different polymer for particular alveoli, or a combination comprising at least one of the foregoing. One possible fill material is foam.

Tubular cooling structure 1008 is shown to illustrate how coolant might interlace the modules 7B, however this cooling structure differs from the cooling structure of the lower enclosure component discussed in FIG. 8. While both of these cooling systems are optional, they can be used alone or together to accomplished desired cooling for a vehicle.

The lower enclosure can be comprised of an enclosure component dimensioned to substantially cover the lower planar face of the battery cells. The enclosure component, such as those disclosed herein, can have a proximal portion and a distal portion, the enclosure component dimensioned such that a distance between the proximal portion and the distal portion can be sized to extend from a first location proximal a first edge of the planar face, across the planar face, to a second location proximal a second edge of the least one planar face that can be opposite the first edge of the least one planar face. An upper enclosure 24 can be sized to couple a top portion 1004 of the battery cells, the upper enclosure 24 can be coupled to the lower enclosure, defining a chamber, and the battery cells can be disposed in the chamber.

The lower enclosure 27 is suitable for a battery assembly for a road-going vehicle with the battery pack facing the road, according to various examples. For the lower enclosure 27, an enclosure component is selected consisting of a metallic lower sheet 29 adhesively bonded to an extruded inner sheet 28. Although selection of the correct adhesive is important, commercial solutions exist. The lower enclosure 27 may comprise at least an extruded inner sheet 28 assembled to a metallic plate 29 which is exposed to the road, in order to form an lower enclosure 27 configured to protect the assembly from projections and obstacles from the road.

The metallic plate can provide EMI shielding from outside of the vehicle. The lower enclosure can be fastened along the frame of the battery pack with fasteners, adhered, or otherwise coupled, similar to the upper enclosure. In addition to protecting the battery pack 17 from obstacles and projection from the road, the metallic plate 29 in the hybrid lower enclosure is able to conduct heat in plane, i.e. longitudinally, while the inner sheet 28 reduces conduction of heat into the battery this is important as: it minimizes local hot or cold spots during operation and in the event of a flame or ignition source it spreads the energy on a larger surface.

In some embodiments, the upper enclosure 24 and/or the lower enclosure 27 are made of thermoplastic material, as for example polypropylene with low specific gravity or thermally conductive polycarbonate. Some of the components of the battery pack, such as the frame 18 and/or the bottom enclosure are formed from at least one of the group including, UL94 V0 polyolefin compounds with high specific strength and specific stiffness, UL94 V0 high flow engineering thermoplastic compounds with good adhesive compatibility for thin gauge internal components, and any of a family of polyester compounds with low temperature ductility for impact absorbers. In some embodiments, the bottom enclosure can comprise on one or both surface(s) some ribs in order to increase the stiffness and its torsion resistance, preferentially in the inner surface.

The upper enclosure 24 can be injection molded from a flame retardant glass fiber filled polyolefin. In some embodiments, upper enclosure 24 is in thermoplastic material, composite and or metal. One or more of the upper enclosure 24 and lower enclosure 27 can be formed of a material having a dK/dF selected for radio compatibility, conductive compatibility or other some other electromagnetic compatibility. This can protect vehicle electronics and/or electronics within the battery pack from EMI. EMI shielding can also be obtained by over molding a metallic member with a polymer to form such a component. In examples where the upper enclosure is formed as such, it can be bolted along the frame of the battery pack with an elastomer seal to ensure pressure sealing. Alternatively, it can also be adhesively bonded with frame using two sided adhesive tape.

In some embodiments, some or all the thermoplastic material parts of the assembly may comprise one or more of the following: additives and/or stabilizers like anti-oxidants, UV stabilizers, pigments, dyes, adhesion promoters, and a flame retardant e.g. mixture of an organic phosphate compound (for example piperazine pyrophosphate, piperazine polyphosphate and combinations thereof), an organic phosphoric acid compound (for example phosphoric acid, melamine pyrophosphate, melamine polyphosphates, melamine phosphate) and combinations thereof, and zinc oxide, and/or a filler, e.g., fibers. For example, a fiber-filled polyolefin can be used. Possible fiber material may include at least one of glass, carbon, aramid, or plastic, preferably glass. The fiber length can be chopped, long, short, or continuous. In particular, long glass fiber-filled polypropylene (e.g. STAMAX™ available from SABIC) may be used. Long fibers are defined to have an initial fiber length, so before molding, of at least 3 mm.

FIG. 12A shows a perspective view of an inner sheet, according to some examples. FIG. 12B shows a close up of the section labeled 12B in FIG. 12A. FIG. 12C shows an end view of the inner sheet of FIG. 12A. FIG. 12D shows a section view of the section labeled 12D in FIG. 12C. The figures simply show exemplary dimensions for the inner sheet 28 illustrated in FIGS. 9-11B. Dimension D121 can be approximately 2310 mm. Dimension D122 can be approximately 1370 mm. Dimension D123 can be approximately 68.5.

Figure 13A:
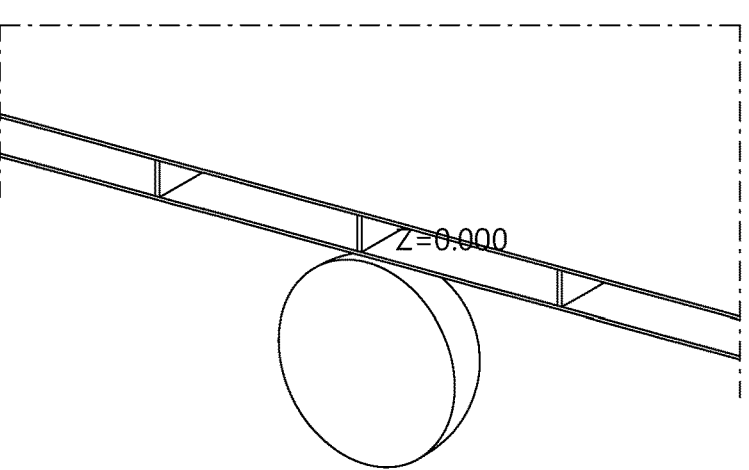
FIG. 13A shows a cross-section of a simulated drop test before deflection, according to some examples.
Figure 13B:
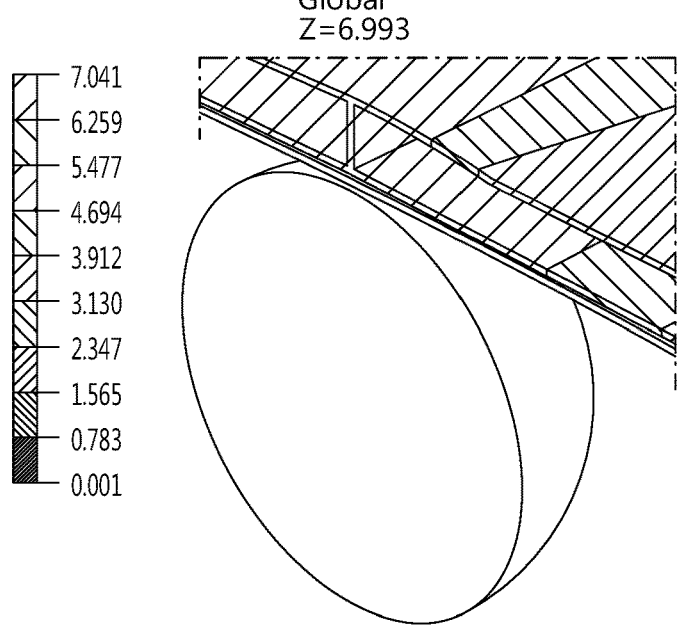
FIG. 13B shows a cross-section of a simulated drop test showing a first level of stress, according to some examples.
Figure 13C:
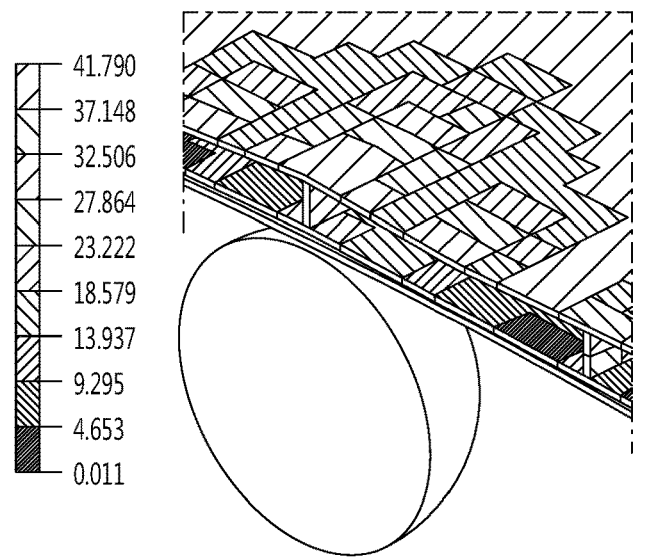
FIG. 13C shows a cross-section of a simulated drop test showing a second level of stress, according to some examples.

FIG. 13A shows a cross-section of a simulated drop test before deflection, according to some examples. FIG. 13B shows a cross-section of a simulated drop test showing a first level of stress, according to some examples. FIG. 13C shows a cross-section of a simulated drop test showing a second level of stress, according to some examples. The data shown in the figures illustrates the flexure of the inner sheet 28 when dropped on a solid obstacle. The figures illustrate that the inner sheet 28 is capable of absorbing an adequate amount of stress versus prior configures of the battery pack 17, such as the battery pack disclosed in European Patent Application No. EP19202591.4 to SABIC. Thus, the battery pack can be configured to deflect less than a battery pack of equal construction but with an injection molded inner sheet having similar dimensions to the inner sheet.

Figure 14:
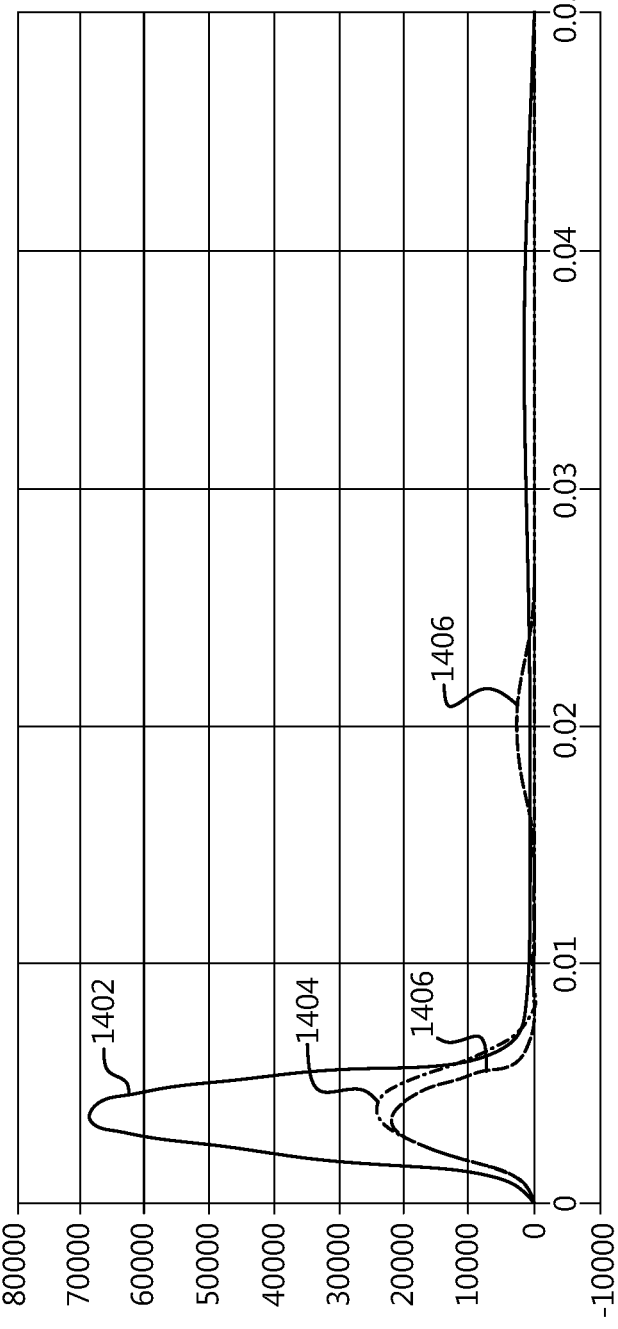
FIG. 14 shows a Force vs. Time curve for a battery pack drop, according to some examples.

FIG. 14 shows a Force vs. Time curve for a battery pack drop, according to some examples. The illustration shows the effect of dropping a complete battery pack 17 from a height with the tray configuration of FIG. 11A-11B. The multiwall allows energy absorption and thus reduce force transfer to the batteries when compared to a full metal tray (baseline). The force reduction of an extruded contour can be at the same level as the one achieved by incorporating molded in honeycombs (molded).

The term "battery" is defined herein to include all kind of batteries, preferentially but not limited lithium ion batteries, in particular the one comprising pouch battery cell(s), which may undergo swelling due to the buildup of pressure within the cell. Swelling may result in shifting of the internal components of the pouch cells. For example, the electrode of the pouch cell may separate, degrading the chemical properties of the prismatic cell. Further, uncontrolled swelling of the pouch cells may drastically decrease their efficiency and product life. Accordingly, it would be desirable to provide compression to the pouch cells to protect their chemical integrity, and thus their efficiency and product life.

The term "battery pack" is defined herein to include a battery enclosure containing a battery according to various examples.

The term "Electric vehicle battery assembly" is defined herein to include at least a battery pack surrounded by a frame to maintain it, a upper enclosure and a lower enclosure.

The present application describes various technical features and advantages with reference to the FIGS. and/or to various embodiments. One skilled in the art will understand that the technical features of a given embodiment may in fact be combined with features of another embodiment unless the opposite is explicitly mentioned or if it is obvious that these features are incompatible and that the combination does not provide a solution to at least one of the technical problems mentioned in the present application. Further, the technical features described in a given embodiment may be isolated from the other features of this embodiment unless the opposite is explicitly mentioned.

It should be obvious for persons skilled in the art that the present invention allows embodiments in many other specific forms without departing from the field of application of the invention as claimed. Therefore, the present embodiments have to be considered as an illustration, but may be modified in the field defined by the scope of the appended claims, and the invention should not be limited to the details given above.

What is claimed is:

1. An apparatus for housing battery cells arranged in a cluster defining a planar face, the apparatus comprising:
    an enclosure component dimensioned to substantially cover the planar face, the enclosure component having a proximal portion and a distal portion, the enclosure component dimensioned such that a distance between the proximal portion and the distal portion is sized to extend from a first location proximal a first edge of the planar face, across the planar face, to a second location proximal a second edge of the planar face that is opposite the first edge of the planar face, the enclosure component comprising:
    an inner sheet defining an inner sheet upper contour along an upper major face and an inner sheet lower contour along a lower major face disposed opposite the upper major face, wherein the inner sheet comprises a monolithic extrusion formed of a thermoplastic and defining a plurality of elongate parallel hollows extending a length of the enclosure component, between the proximal portion and the distal portion;
    a lateral inner sheet disposed lateral to the inner sheet, defining a gap there between;
    a damper disposed in the gap; and
    a lower sheet disposed against the inner sheet, the damper and the lateral inner sheet, wherein the lower sheet defines a lower contour shaped to conform to the inner sheet lower contour of the inner sheet, wherein the lower sheet is formed of a material other than the thermoplastic of the inner sheet,
    wherein the inner sheet and the lower sheet are fastened together such that the enclosure component forms a rigid assembly, and
    wherein the damper is slidable with respect to the inner sheet, the lateral inner sheet and the lower sheet.

2. The apparatus of claim 1, comprising a second inner sheet disposed against the inner sheet, the second inner sheet defining a second plurality of elongate hollows that are disposed skew to the plurality of elongate hollows of the inner sheet.

3. The apparatus of claim 1, wherein the damper has a different spring rate than at least one of the inner sheet and the lateral inner sheet.

4. The apparatus of claim 1, wherein the damper comprises a first section and a second section slidable in relation to one another.

5. The apparatus of claim 1, comprising:
    an upper sheet disposed against the inner sheet, wherein the upper sheet defines an upper sheet contour shaped to conform to the inner sheet upper contour of the inner sheet, wherein the upper sheet is formed of a material other than the thermoplastic of the inner sheet; and wherein the upper sheet, inner sheet, and lower sheet are fastened together in a composite wall that forms an assembly that is more rigid than any one of the upper sheet, inner sheet, and lower sheet.

6. The apparatus of claim 5, comprising an adhesive disposed along at least one of an upper interface between the upper sheet and the inner sheet, and a lower interface between the lower sheet and the inner sheet.

7. The apparatus of claim 1, wherein the plurality of elongate parallel hollows are organized in a plurality of rows stacked onto one another through a thickness of the inner sheet, with each of the plurality of rows extending transverse to the length of the enclosure component.

8. The apparatus of claim 7, comprising a manifold coupled with the inner sheet, the manifold defining an interior volume disposed in fluid communication with a plurality of coolant hollows (802) of the plurality of elongate parallel hollows, such that the inner sheet is configured to direct coolant along the length of the inner sheet via the plurality of coolant hollows.

9. The apparatus of claim 8, comprising:
an upper sheet disposed against the inner sheet, proximal the plurality of coolant hollows.

10. The apparatus of claim 9, wherein the upper sheet encloses the plurality of coolant hollows such that they are sealed along their length to communicate coolant there through.

11. The apparatus of claim 7, wherein at least some of the plurality of elongate parallel hollows are entirely walled by thermoplastic, defining an elongate hollow chamber.

12. The apparatus of claim 11, wherein the at least some of the plurality of elongate parallel hollows are configured to communicate coolant fluid.

13. The apparatus of claim 1, wherein the inner sheet defines a plurality of elongate ribs extending along the length of the inner sheet defining respective sidewalls of the plurality of elongate parallel hollows.

14. The apparatus of claim 1, comprising a fastener fastening the inner sheet to the lower sheet.

15. A battery pack housing having a bottom wall formed from an apparatus the apparatus comprising an enclosure component dimensioned to substantially cover a planar face of battery cells, the enclosure component having a proximal portion and a distal portion, the enclosure component dimensioned such that a distance between the proximal portion and the distal portion is sized to extend from a first location proximal a first edge of the planar face, across the planar face, to a second location proximal a second edge of the planar face that is opposite the first edge of the planar face, the enclosure component comprising:
an inner sheet defining an inner sheet upper contour along an upper major face and an inner sheet lower contour along a lower major face disposed opposite the upper major face, wherein the inner sheet comprises a monolithic extrusion formed of a thermoplastic and defining a plurality of elongate parallel hollows extending a length of the enclosure component, between the proximal portion and the distal portion;
a lateral inner sheet disposed lateral to the inner sheet, defining a gap there between;
a damper disposed in the gap; and
a lower sheet disposed against the inner sheet, the damper and the lateral inner sheet, wherein the lower sheet defines a lower contour shaped to conform to the inner sheet lower contour of the inner sheet, wherein the lower sheet is formed of a material other than the thermoplastic of the inner sheet,
wherein the inner sheet and the lower sheet are fastened together such that the enclosure component forms a rigid assembly, and
wherein the damper is slidable with respect to the inner sheet, the lateral inner sheet and the lower sheet.

16. A battery pack comprising one or more battery cells arranged in a cluster defining a planar face wherein the cluster is contained within an enclosure component dimensioned to substantially cover the planar face, the enclosure component having a proximal portion and a distal portion, the enclosure component dimensioned such that a distance between the proximal portion and the distal portion is sized to extend from a first location proximal a first edge of the planar face, across the planar face, to a second location proximal a second edge of the planar face that is opposite the first edge of the planar face, the enclosure component comprising:
an inner sheet defining an inner sheet upper contour along an upper major face and an inner sheet lower contour along a lower major face disposed opposite the upper major face, wherein the inner sheet comprises a monolithic extrusion formed of a thermoplastic and defining a plurality of elongate parallel hollows extending a length of the enclosure component, between the proximal portion and the distal portion;
a lateral inner sheet disposed lateral to the inner sheet, defining a gap there between;
a damper disposed in the gap; and
a lower sheet disposed against the inner sheet, the damper and the lateral inner sheet, wherein the lower sheet defines a lower contour shaped to conform to the inner sheet lower contour of the inner sheet, wherein the lower sheet is formed of a material other than the thermoplastic of the inner sheet,
wherein the inner sheet and the lower sheet are fastened together such that the enclosure component forms a rigid assembly, and
wherein the damper is slidable with respect to the inner sheet, the lateral inner sheet and the lower sheet.

17. The battery pack of claim 16 comprising
an upper sheet disposed against the inner sheet, wherein the upper sheet defines an upper sheet contour shaped to conform to the inner sheet upper contour of the inner sheet, wherein the upper sheet is formed of a material other than the thermoplastic of the inner sheet; and
wherein the upper sheet, inner sheet, and lower sheet (are fastened together in a composite wall that forms an assembly that is more rigid than any one of the upper sheet,inner sheet, and lower sheet.

18. The battery pack of claim 16 wherein the plurality of elongate parallel hollows are organized in a plurality of rows stacked onto one another through a thickness of the inner sheet, with each of the plurality of rows extending transverse to the length of the enclosure component.

19. The battery pack of claim 18 wherein at least some of the plurality of elongate parallel hollows are entirely walled by thermoplastic, defining an elongate hollow chamber.

20. The battery pack of claim 19 wherein the at least some of the plurality of elongate parallel hollows are configured to communicate coolant fluid.

* * * * *